United States Patent [19]
Benckert et al.

[11] 4,299,393
[45] Nov. 10, 1981

[54] AREA RADIATION TARGET

[75] Inventors: Willis J. Benckert, Altamonte Springs; Richard J. Wangler, Maitland, both of Fla.

[73] Assignee: International Laser Systems, Inc., Orlando, Fla.

[21] Appl. No.: 140,316

[22] Filed: Apr. 14, 1980

[51] Int. Cl.³ ................................................. F41J 5/02
[52] U.S. Cl. .................................. 273/310; 350/96.15; 350/96.24
[58] Field of Search ....................... 273/310, 311, 312; 434/21, 22; 350/96.24, 96.15

[56] References Cited
U.S. PATENT DOCUMENTS

| | | | |
|---|---|---|---|
| 2,638,554 | 5/1953 | Bartow et al. | 350/96.1 X |
| 3,308,709 | 3/1967 | Harrick | 350/96.1 |
| 3,387,909 | 6/1968 | Anderson et al. | 350/96.15 |
| 3,487,223 | 12/1969 | St. John | 350/96.1 X |
| 3,736,217 | 5/1973 | Nagao | 350/96.24 X |
| 4,138,193 | 2/1979 | Olszewski et al. | 350/96.24 X |

*Primary Examiner*—Anton O. Oechsle
*Attorney, Agent, or Firm*—William M. Hobby, III

[57] ABSTRACT

A target apparatus for detecting laser radiation, or the like, impinging thereon. The target has a support having a plurality of fiber optic fibers mounted thereon with their ends attached to a radiation detector and amplifier. A radiation scattering cover covers the fiber optic fibers on at least one side to scatter radiation impinging thereupon adjacent the fibers, thereby changing the angle of light entering the fibers to produce a signal on the detector to indicate a beam of radiation hitting the target.

14 Claims, 5 Drawing Figures

AREA RADIATION TARGET

TECHNICAL FIELD

The present invention relates to radiation detectors and especially to a target for detecting a laser beam, or the like, such as from a simulated weapon.

In recent years, simulated training devices have become more common, to conserve materials, or to add realism in the training of personnel. One such technique utilizes a simulated weapon which can shoot a laser beam in place of a shell, or the like, at various types of objects or people used as targets. The target needs a system for detecting when a hit has been made upon the target and in the case of lasers, an optical detector is needed. This type of detection can be accomplished by conventional detectors using photocells, but it is desirable to have an inexpensive target detector that can detect over a large area to indicate a hit anywhere on the area. Accordingly, the present invention is directed toward an area target for laser simulation of weapon firing which can cover a large area in an inexpensive manner.

Typical laser simulated weapons can be seen in U.S. Pat. No. 4,012,059, and in U.S. Pat. No. 3,995,376, both to Kimbel, et al., for a small arms laser training device for shooting at simulated targets with a laser beam. These patents, however, are directed toward the simulated weapon rather than to the particular target being fired upon.

DISCLOSURE OF INVENTION

The present invention relates to a radiation detector surface which is suitable for use as a laser detector target and which has a supporting surface supporting one or more fiber optic fibers of a type exhibiting Rayleigh scattering phenomena. The ends of each fiber optic fiber are operatively attached to a radiation detector and the fibers are covered with a material to create scattering of the radiation impinging thereupon to vary the angle of radiation entering the fiber optic fibers to produce a stronger signal in the detector. When used as a target, a radiation detector includes a plurality of fiber optic fibers mounted in a spaced relationship to each other on the target or a support attached to the target and each end of each fiber is operatively connected to a radiation detector for detecting radiant energy transmitted by the fibers. A radiation scattering cover covers at least one side of the fiber optic fibers to scatter radiation impinging thereupon adjacent the fibers to scatter the radiation entering the fibers so that some of the radiation enters the fibers at a different angle to be trapped by the total internal reflection of the fiber walls.

BRIEF DESCRIPTION OF DRAWINGS

Other objects, features and advantages of the present invention will be apparent from the written description and the drawings, in which.

BEST MODES FOR CARRYING OUT THE INVENTION

Figure 1:
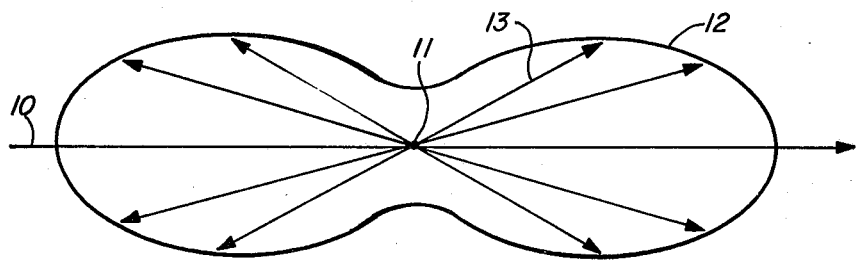
FIG. 1 is a scatter diagram.
Figure 2:
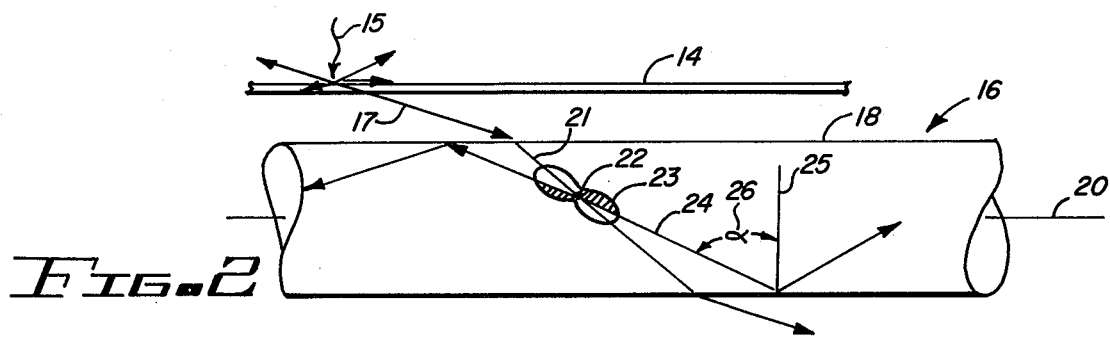
FIG. 2 is an elevation of a portion of a fiber optics fiber with a scatter diagram in accordance with the present invention.

Prior art fiber optics, especially those made of polymer material have a "fault" which causes a relatively large loss in transmission of radiation, but which makes it possible to couple radiation laterally into the fibers allowing it to be transmitted into an optical detector at the fiber ends. The materials have a characteristic called "haze" which is the presence of very small scattering centers which produces what is referred to as the Rayleigh scattering phenomenon. This phenomenon is illustrated in FIG. 1, in which optical radiation indicated by line 10 entering laterally into a cylindrical fiber optic fiber intersects a scattering center 11 producing the scattering pattern 12 of the various scattered radiation 13. Normally, radiation entering the cylindrical fibers from the side would be refracted into the fiber and will theoretically be refracted out of the other side of the fiber. If, however, the radiation 10 encounters a scattering center 11, some of the radiation will be deflected at fairly large angles in a pattern as illustrated in FIG. 1. Most of the radiation scattered from a radiation center 11 from direct laser radiation will be at such large angles to the fiber axis that no appreciable radiation will be at sufficiently large angle of incidence to the fiber walls to be trapped by the total internal reflection of the fiber. If the fiber is partially surrounded by a powerful scattering medium such as a porous cloth or a plastic tube 14 in FIG. 2, laser radiation 15 entering the side of a fiber optic fiber 16 will first encounter the scattering medium 14 which produces scattered radiation 17 entering the side 18 of the fiber optic fiber 16 at a substantially inclined angle to the fiber axis 20. The scattering medium 14 is called a "Mie" scatterer which scatters the radiation in all directions. The scattered radiation 17 entering the fiber 16, is refracted as shown by the line 21 and if it then intersects a Rayleigh scattering center 22, a scattering pattern 23 is formed producing scattered radiation at a variety of angles as indicated by the radiation lines 24 which has an incident angle from an imaginary line 25 perpendicular to the axis 20 within the critical angle of incidence required to trap the radiation within the fiber 16 walls by the internal reflection of the fiber and thus be conducted to a detector at the end of the fiber 16. The critical angle of incidence is indicated at 26 between the scattered radiation 24 and the line 25 which is normal to the fiber wall.

Figure 4:
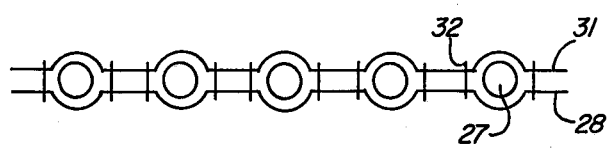
FIG. 4 is a sectional view taken on the line 4—4 of FIG. 3.
Figure 3:
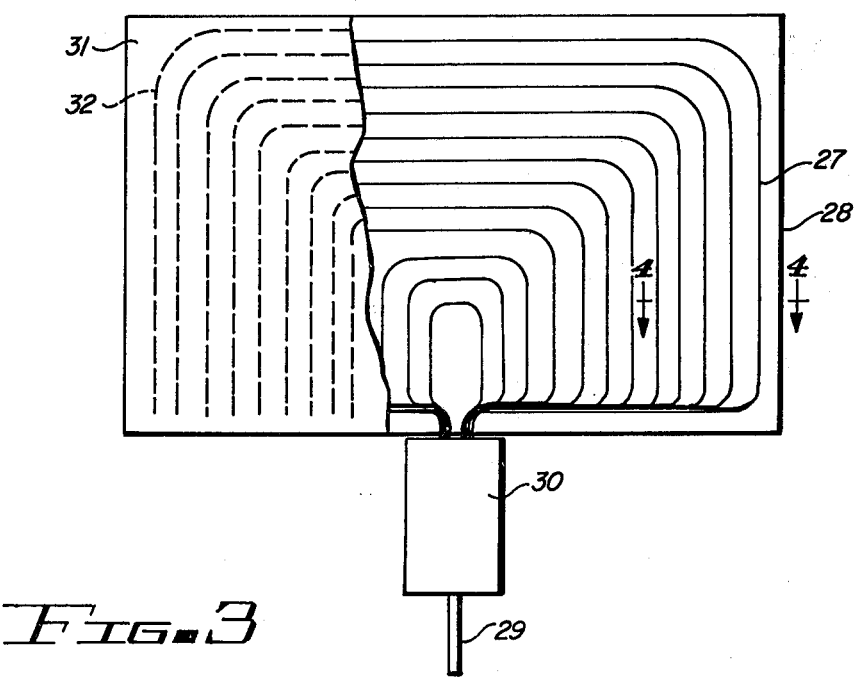
FIG. 3 is a plan view of a target in accordance with the present invention.

In the present invention, a plurality of fiber optic loops 27, as illustrated in FIGS. 3 and 4, are mounted on a base 28 which can be cloth, such as denim cloth, but can be any material desired, such as wood or metal or the target itself to support the fibers 27 in a predetermined pattern. The fibers laid out in the pattern 27 have both of their ends feeding into a detector and detector amplifier 30 and are covered with a scattering medium 31 which can be any porous cloth, paper or plastic, or the like, such as might be made of a nylon cheesecloth material or any other synthetic or real fiber which normally diffuses the radiation to produce scattering. As illustrated in FIG. 4, the fibers 27 have the base 28 covered by the scattering medium 31 which is stitched with stitches 32 or otherwise held in place on the base where the base 28 is a cloth or garment material, thereby providing a flexible target which holds the fibers 27 in position. A laser beam impinging upon the scattering medium 31 will thus produce a scattered radiation entering the fibers 27 as indicated in FIG. 3, which when intersecting a scattering center (FIG. 2) will further scatter the radiation at angles which will allow the radiation to be trapped within the fibers 27 and directed into the detector 30 where a detector such as a photodiode detects a sudden increase in energy, such as produced by a laser beam hitting the cloth 31. A power and signal cable 29 is connected to the detector 30 to power the detector and to feed the signals from the detector. As can be seen at this point, FIG. 3 can be utilized as a target by mounting in a personnel jacket or on a vehicle or the like, and will give an indication over a large area indicating that a hit has been made on the target. The spacing of the fibers depends upon the size of the beam and the distance from the target. The beam would have to impinge directly over or adjacent at least one fiber. The target itself can be used as the support for the fibers with the fibers attached directly to the target and where support is used herein it is meant to include mounting the fibers directly on a target without departing from the spirit and scope of the invention.

Figure 5:
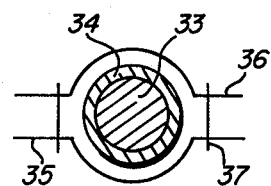
FIG. 5 is a sectional view taken through one fiber showing an alternate embodiment.

FIG. 5 shows an alternate embodiment in which a fiber optic fiber 33 is surrounded by a transparent plastic tube 34, such as a polytrifluoro-chloroethylene tube, to protect the fiber from abrasion. The tube 34 is mounted to a base 35 and is covered with a scattering medium 36 with the base 35 and scattering medium 36 stitched with stitches 37 or otherwise attached to hold the scattering medium in close proximity to the fiber and protective tubing.

It should be clear at this point that while one embodiment of a simulated target in which both ends of a plurality of loops of fibers have both ends brought together and operatively connected to a photodetector, other embodiments are contemplated as being within the scope of the invention. For instance, different loop patterns or sectors can feed into separate detectors to provide an indication that a particular area has been hit by radiation from a laser beam, or the like. Polymer fibers typically have Raleigh scattering, but glass fibers can be used where the glass fibers are imperfect. Accordingly, this invention is not to be construed as limited to the particular forms disclosed herein, which are to be considered illustrative rather than restrictive.

We claim:

1. A radiation detector comprising in combination:
   support means;
   radiation detector means;
   a plurality of fiber optic fibers mounted in a spaced relationship to each other on said support means and having at least one end of each fiber operatively connected to said radiation detector means for detecting radiation impinging upon said fibers; and
   radiation scattering means covering at least a portion of the sides of each of said fibers to scatter radiation impinging thereupon adjacent to said fibers to scatter radiation entering into said fibers, whereby the angle of radiation entering said fibers is varied to produce a stronger signal in said radiation detector means.

2. A radiation detector in accordance with claim 1, in which both ends of said fiber optic fibers are operatively connected to said radiation detector means.

3. A radiation detector in accordance with claim 1, in which said radiation scattering means is a flexible cloth material attached over said plurality of fiber optic fibers to said support means.

4. A radiation detector in accordance with claim 3, in which said radiation scattering means is a synthetic cloth material.

5. A radiation detector in accordance with claim 4, in which said support means is flexible cloth.

6. A radiation detector in accordance with claim 1, in which said radiation detector means is a photodiode.

7. A radiation detector in accordance with claim 5, in which the support means and the radiation scattering means are stitched together along the fiber optic fibers to hold the fiber optic fibers in place.

8. A radiation detector in accordance with claim 6, in which said radiation detector means generates an electrical signal and an amplifier amplifies the generated signal.

9. A radiation detector in accordance with claim 2, in which said fiber optic fibers are polymer fibers.

10. A radiation detector in accordance with claim 1, in which each fiber optic fiber is located inside a transparent polymer tube.

11. A radiation detector in accordance with claim 1, in which said plurality of fiber optic fibers are spaced a predetermined distance based upon the size of a beam of radiation used in conjunction therewith and the distance anticipated between the radiation source and the target.

12. A radiation detector in accordance with claim 1, in which said plurality of fiber optic fibers are divided into sectors and said radiation detector means includes a plurality of radiation detectors each coupled to a sector of said plurality of fiber optic fibers.

13. A radiation detector comprising in combination:
   radiation detection means;
   at least one fiber optic fiber having at least one end operatively connected to said radiation detector means;
   scattering means covering a portion of said fiber optic fibers to produce a first scattering of radiation impinging thereupon to produce scattered radiation entering the lateral side of said fiber optic fiber and said fiber optic fiber producing a second scattering of radiation to produce radiation in said fiber optic fiber trapped by the total internal reflection of the fiber.

14. A radiation detector in accordance with claim 13, in which a plurality of fiber optic fibers are operatively connected to said radiation detection means spaced in a predetermined manner to form a target area.

* * * * *